June 21, 1966 J. GREENSPAN 3,256,801
MEAT TENDERIZING
Filed Feb. 12, 1964 3 Sheets-Sheet 1

INVENTOR.
Joseph Greenspan,
BY
Byron, Hume, Groen + Clement
Attys.

June 21, 1966  J. GREENSPAN  3,256,801
MEAT TENDERIZING

Filed Feb. 12, 1964  3 Sheets-Sheet 3

INVENTOR.
Joseph Greenspan,
BY
Byron, Hume, Groen + Clement
Attys.

United States Patent Office 3,256,801
Patented June 21, 1966

3,256,801
MEAT TENDERIZING
Joseph Greenspan, Evergreen Park, Ill., assignor to Frigidmeats, Inc., Chicago, Ill., a corporation of Illinois
Filed Feb. 12, 1964, Ser. No. 344,336
2 Claims. (Cl. 99—254)

The present invention relates to means for tenderizing meat and particularly to a new and improved apparatus adapted for impregnating meat cuts with a tenderizing solution.

It is a general object of the present invention to provide a new and improved tenderizing machine whereby tenderizing solution may be injected into a cut of meat in a controlled manner so as to render the meat properly tenderized throughout its thickness.

Another object of the invention is to provide a new and improved tenderizing machine and process for effecting a more even distribution for liquid tenderizer both over the surface and throughout the thickness of the cut of meat whereby more uniform tenderization of the cut of meat is achieved.

A further object of the invention is to provide a new and improved apparatus for injecting tenderizing solution into a cut of meat whereby the appearance on the surface of the meat is relatively unaffected.

It is a further object of the invention to provide a tenderizing machine wherein the injection of tenderizing solution is accomplished by a simple, rugged structure which adapts to the contours and bone structure of the pieces of meat on which it operates.

A more specific object of the invention is to provide an improved tenderizing machine construction wherein the movement of meat within the machine is accomplished by sliding the meat upon a film of fluid.

A further specific object of the invention is to provide a new and improved meat tenderizing machine in which injection of tenderizing fluid into the meat is accomplished by piercing the meat with a plurality of spring loaded pins which are continuously bathed in meat tenderizing solution.

These and other objects of the invention are accomplished by the tenderizing machine embodying the principles of the present invention, wherein the machine includes a feed table adapted to be tilted, means for providing a fluid film on the surface of the table, a bank of individually mounted spring loaded pins adapted for retractable movement from the table, and an arrangement for furnishing a bathing solution of tenderizer to the bank of rods, so that tenderizing meat may be accomplished by feeding successive cuts of meat on a film of fluid into a perforating station area; there piercing the meat with an assembly of pins bathed in meat tenderizing solution; and finally removing the cuts of meat from the perforating station area on a film of fluid.

The invention, both as to its scope and method of operation, will be understood by reference to the following specification and drawings forming a part thereof, wherein.

Figure 1:
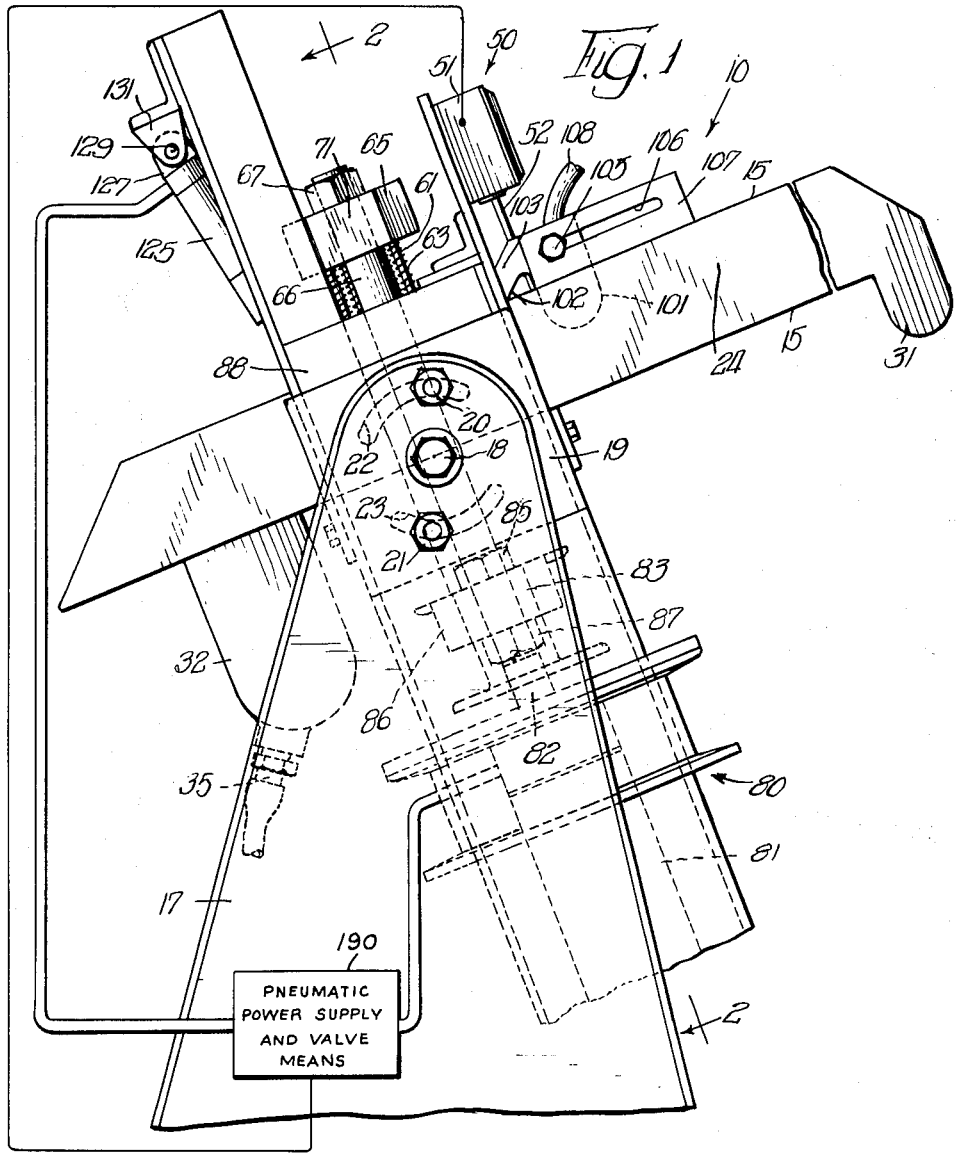
FIGURE 1 is a side elevation of a meat tenderizing apparatus in accordance with the present invention.
Figure 2:
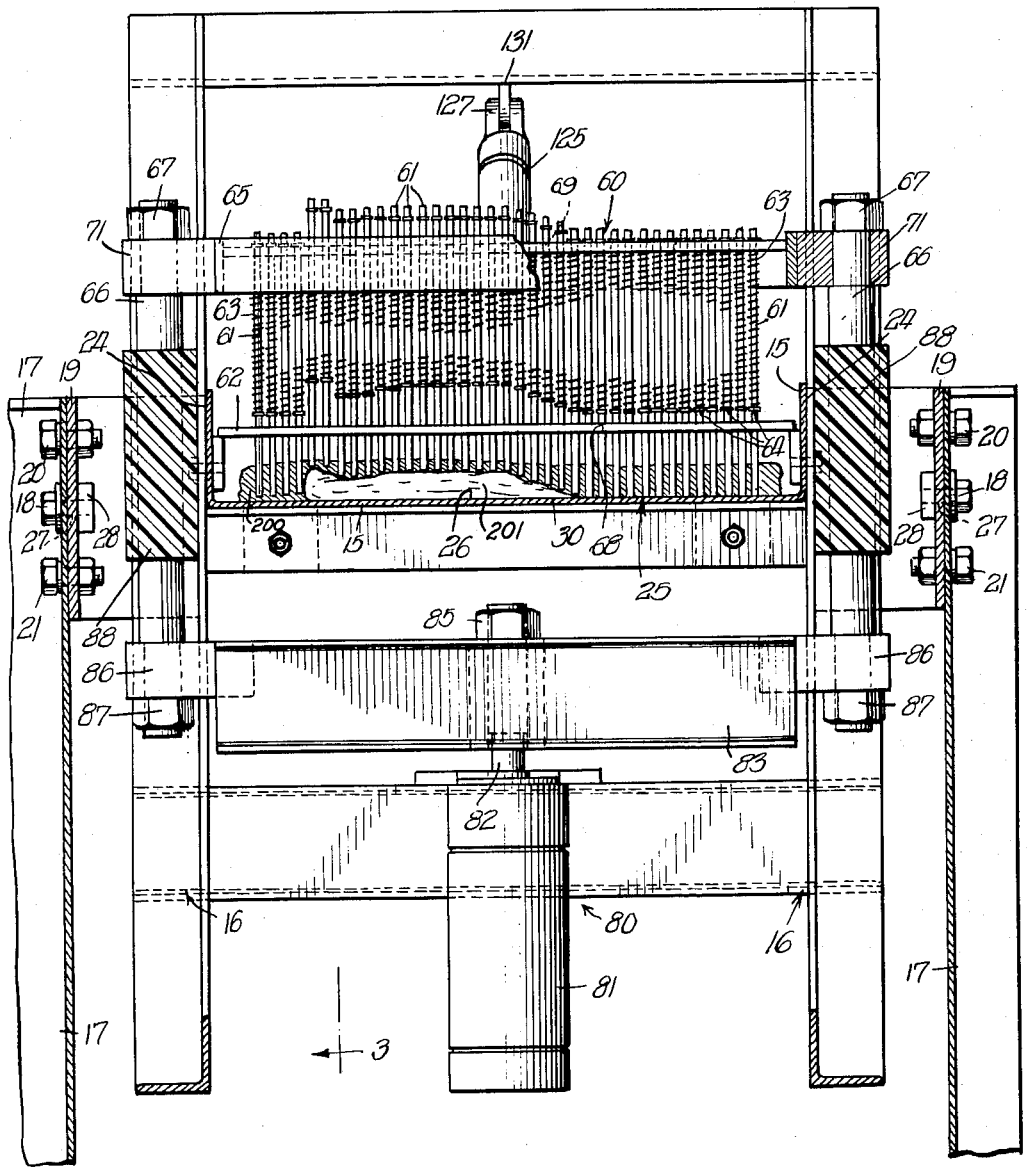
FIGURE 2 is a front cross-sectional view of the apparatus of FIGURE 1, taken along the lines 2—2 of FIGURE 1, showing therein an exemplary piece of meat containing a bone.
Figure 3:
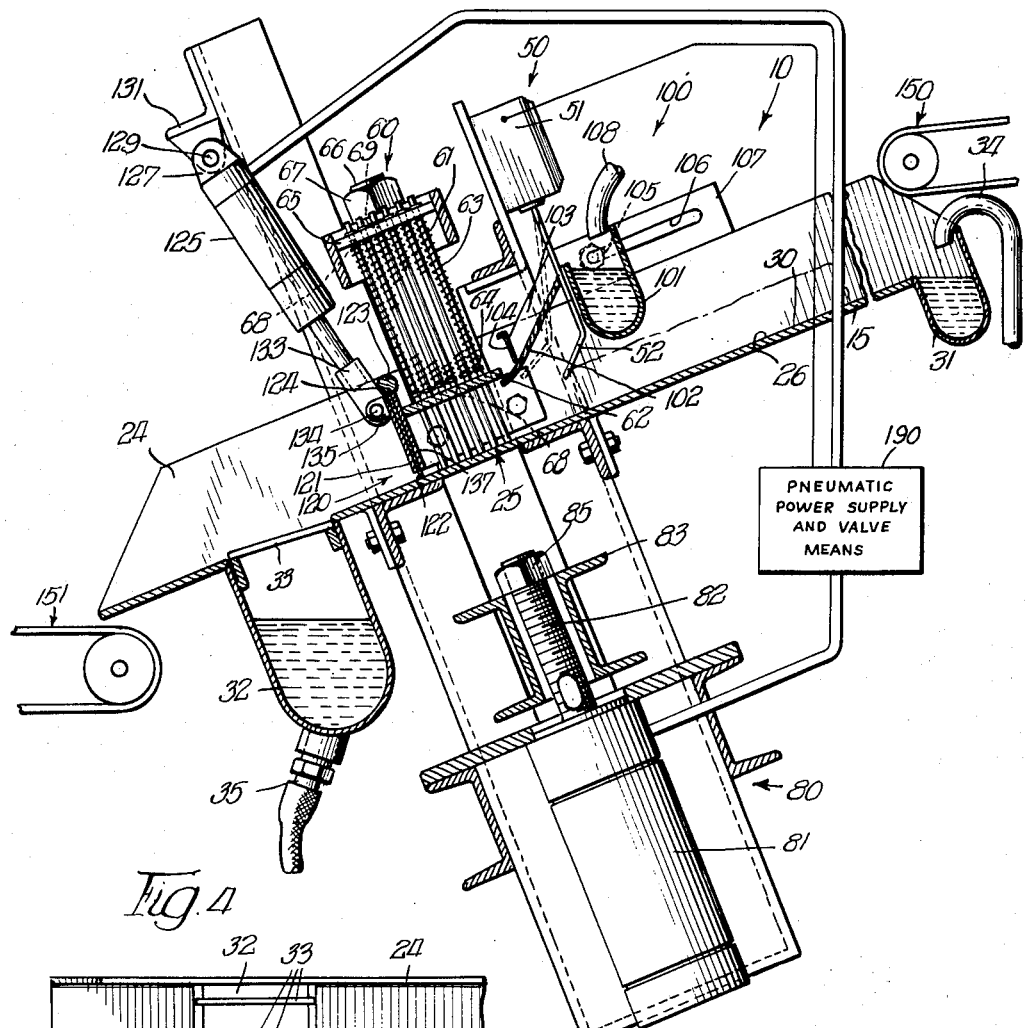
FIGURE 3 is a side cross-sectional view taken along the lines 3—3 of FIGURE 2.
Figure 4:
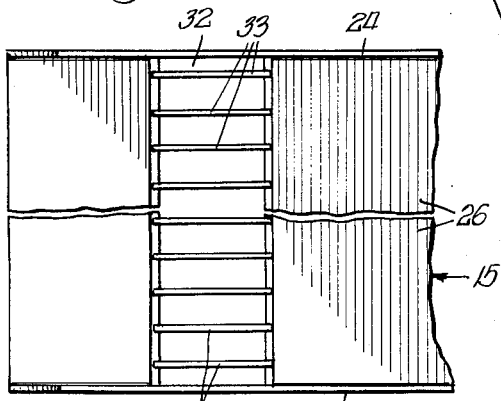
FIGURE 4 is a top plan view of the lower end of the table 15 shown in FIGURE 3.

A meat tenderizing device 10, embodying the features of the invention, is shown in FIGURES 1 through 4. The tenderizing device 10 comprises, in its elements, a table 15 adapted to be tilted at an angle, a fluid film means 30 adapted to form a continuous fluid of film upon the surface 26 of the table 15, a control apparatus 50 for controlling the operation of the device, a gate apparatus 120 for halting the movement of the piece of meat, a pin assembly 60 and a pin assembly driving means 80 for reciprocally moving the pin assembly 60 with respect to the table 15.

The table 15 has rigidly secured to it by conventional nut and bolt and welded construction, a frame assembly 16 to support operating assemblies. The table 15 and its attached frame assembly 16 are supported by two vertical legs 17 whose bases rest against the floor (not shown). The two legs 17 are pivotally connected to respective sides of the table 15 by means of a large bolt 18 which is secured through holes 27 in each leg 17 to a nut 28 welded to a channel member 19. The channel member 19 is a part of the frame assembly 16. In this manner, the entire table 15 and the frame assembly 16 may rotate with respect to the legs 17. In order to lock the table 15 in position, two further bolts 20 and 21 are fitted through corresponding annular slots 22 and 23 in the legs 17 and are threaded into corresponding nuts welded to channel member 19. By tightening bolts 20 and 21 the table 15 may be locked at any desired angle. The table 15 is provided with vertical sides 24 which serve to confine fluid to the surface 26 of the table 15.

The means 30 for providing a continuous fluid film upon the table 15 consists basically of a trough 31 secured to the high end of the table 15, and a second rough 32 set below the surface of the low end of the table 15, and covered by a screen 33. The trough 31 is supplied continuously through inlet pipe 34 with any suitable liquid meat tenderizing solution, for example a commercially available enzyme preparation sold by Freezer Laboratories of Chicago, Illinois, under the name "FM-102 Meat Tenderizer." The trough 31 is positioned so that it overflows onto the surface 26 of the table 15 evenly across the entire width of the table 15, thus forming a continuous fluid on the surface 26 as the tenderizing solution runs down the table 15. The inlet pipe 34 is provided with the tenderizing solution by means of a conventional centrifugal pump (not shown) drawing from a conventional tank or reservoir (not shown) of tenderizing fluid. The tank of tenderizing fluid is preferably also connected to an outlet pipe 35 attached to the bottom of trough 32, thereby recirculating and reusing the tenderizing solution. The film of tenderizing fluid flows downwardly on the surface 26, due to the tilt of the table 15, until it reaches the screen 33. The screen 33 is composed of parallel spaced rods placed across the opening of the trough 32, and forming in effect part of the surface 26 of the table 15. Pieces of meat sliding down the table 15 will readily slide over the screen 33, but tenderizing solution will run through the screen 33 down into the trough 32.

The control apparatus 50 of the embodiment consists of a switch 51, of a conventional electrical or pneumatic type, actuated by movement of an extension arm 52. A piece of meat sliding down the table 15 will strike the extension arm 52 and move it to the position indicated by the dotted lines in FIGURE 2, thereby actuating the switch 51. The switch 51 is connected to conventional commercially available pneumatic power supply and valve means 190 which operate a pneumatic cylinder 81 of the pin assembly driving means 80 and a pneumatic cylinder 125 of the gate apparatus 120. The actuation of the switch 51 causes the above-mentioned components to operate in a sequential operation, as will be explained later.

The pin assembly 60, containing a number of rods or pins 61, is located at a portion of the table 15 which may be called a perforating station 25 and is adapted to be moved reversibly relative to the surface 26. It has been found by the present invention that a plurality of small diameter solid rods 61, when bathed in a tenderizing solution and forced deeply into a body of meat, will carry sufficient tenderizing solution into the meat to cause proper tenderization throughout the meat. In addition, the penetration of the numerous rods 61 in itself causes some mechanical tenderization. A further significant aspect of the invention is the provision for driving a plurality of pins 61 into the meat while allowing each pin to move independently, thereby preventing breakage of any of the pins on bone or hard gristle, yet allowing those pins 61 which enter the flesh to penetrate completely. This may be readily seen from FIGURE 2 especially, where there is shown a piece of meat 200 with a bone 201 therein. Further, it has been found that the rods do not need to have sharp pointed ends. The area of the pin assembly, and therefore the number of pins 61, will naturally vary with the width and length of the pieces of meat which it is desired to operate upon, as it is preferable to subject substantially the entire piece of the meat to the action of the pin assembly 60. An exemplary pin assembly contains approximately 111 pins of 5/32 inch in diameter, evenly positioned 5/8 inch apart (center to center).

Forming a part of the pin assembly 60 is a horizontal guide plate 62 with vertical holes 68 positioned corresponding to the desired positions of each of the pins 61. The holes 68 are slightly larger than the pins 61 so as to allow the pins 61 to freely move reciprocally through the guide plate 62. The guide plate 62 is rigidly bolted to the frame assembly 16.

The pins 61 are each loosely fitted through a long coil spring 63. For the pins 61 described above, an exemplary coil spring 63 would be a flat stainless steel wire compression spring with a force of from 4½ pounds to 5½ pounds at a 4-inch compressed length from a 5¾-inch free length. The lower end of each coil spring 63 is secured to its corresponding pin 61 by means of a grip ring washer 64 secured in a notch in the pin 61. This causes any force present in the coil spring 63 to be directly applied downward upon the pin 61. To position the pins 61 and to apply force to the upper ends of the coil springs 63, and thus to drive the pins 61, an upper yoke 65 is provided. The upper ends of each pin 61 are freely slidable through spaced holes 69 in the upper yoke 65. These holes 69 in the upper yoke 65 correspond to those in the guide plate 62, thereby vertically positioning and spacing the pins 61. As the coil springs 63 are larger in diameter than the holes 69 in the upper yoke 65, when a downward movement of the upper yoke 65 is made, a corresponding compression of the coil springs 63 occurs. The force created thereby is transmitted to the lower ends of each of the coil springs 63, thus applying a downward force upon the pins 61. Because each pin 61 is independently slidable in its mounting holes 69 and 68 in both the upper yoke 65 and the guide plate 62, each pin 61 is free to move independently of all of the other pins 61, subject only to the force applied by its own coil spring 63. To move the pins 61 upward by the upward movement of the upper yoke 65, grip rings 64 in corresponding notches in the upper ends of each pin 61 are provided. The upper yoke 65 is itself supported by two large cylindrical tie rods 66 which are threadably secured to extremities 71 on each side of the upper yoke 65 and further secured by large nuts 67 on the upper ends of the tie rods 66.

The pin assembly driving means 80 is adapted to rapidly raise and lower the upper yoke 65 so as to move the pins 61 reciprocally relative to the table 15 and drive the lower ends of the pins 61 into the meat on the downstroke. This is accomplished in the present device by a large pneumatic cylinder 81 such as a Smeco Industries Model SM-6 (3-inch bore and 1¾-inch stroke) connected to a pneumatic source (not shown) and controlled by the control apparatus 50. The pneumatic cylinder 81 is mounted to a cross-member forming a part of the lower portion of the frame assembly 16. The piston rod 82 of the pneumatic cylinder 81 is threadably attached to an I-beam 83 and further secured by a nut 85. The I-beam 83 has at its two opposite extremities 86 threaded holes adapted to fit corresponding threaded lower end portions of the two tie rods 66. Large nuts 87 on the ends of the tie rods 66 further secure the lower ends of the tie rods 66 to the I-beam 83. By the above connections, it can be seen that when the pneumatic cylinder 81 is actuated, its drive rod 82 will move the I-beam 83 and thereby by means of the tie rods 66 correspondingly move the upper yoke 65. The tie rods 66 are held in position by means of corresponding bores through bearing blocks 88 of plastic such as delrin which are rigidly bolted to frame assembly 16 on each side. Thus, the tie rods 66 are free to move only in a reciprocal path, perpendicular with respect to the table 15. The upper yoke 65 and the tie rods 66 are constructed of suitably strong rigid material to transmit the substantial forces involved.

The concept of injecting tenderizing solution into the meat by means of solid rods whose exterior surfaces are bathed in a tenderizing solution prior to forcing the rods into the meat represents a significant operating advantage over the use of hollow rods in which the tenderizing solution is injected into the meat through the hollow interior of the rods. With a device of the latter type there is a distinct tendency of the needles to clog, a high degree of filtering is required to remove all minutes meat particles from the tenderizing solution. By injecting tenderizing solution via the exterior surface of rods, such clogging problems are eliminated and the rods may be made stronger and more long lasting. Further, bathing the exterior surfaces of the rods serves as a lubrication to assist their penetration into the meat.

The particular pin bathing means 100 utilized in the embodiment 10 consists of a trough 101 extending the width of the table 15 provided with a spillway 102 which serves to deflect the tenderizing solution toward the lower portion of the pins 61. The spillway 102 has sides 103 and a sluice gate 104 to assist in controlling the volume and velocity of the tenderizing solution flowing from the end of the spillway 102. As the piece of meat, when it is at the perforating station 25, is underneath the pins 61, tenderizing solution will also fall on its upper surfaces. This accomplishes tenderization of the upper surfaces of the meat and also enables the pins 61 to inject additional tenderizing solution into the interior of the meat, by carrying therein tenderizing solution present on the surface of the meat, as well as that already upon the pins 61. Note that the pin bathing means 100 may be operated continuously, as any tenderizing solution not absorbed by the meat will run down the table 15 and be recovered in the trough 32. The trough 101 with its spillway 102 and sluice gate 104 is secured at each end by bolts 105 passing through a horizontal slot 106 in each of two frame extensions 107 which are welded to the respective vertical sides 24 of the table 15. In this manner, the position of the pin bathing means 100 may be adjusted so as to bathe the pins 61 in an even manner. An inlet pipe 108 supplies tenderizing solution to the trough 101 from the tank of solution and pump (not shown).

The gate apparatus 120 for stopping the meat at the perforating station 25 consists of a hinged gate 121 extending the width of the table 15 and making a water tight contact, when closed, with both the surface 26 of the table 15 and the sides 24, by means of a gasket 122 of rubber or other suitable material bolted around the outer edge of the gate 121. The gate 121 is swung from a hinge 123 which consists of a cylindrical rod 124 welded to the top edge of the gate 121. The ends of the rod 124 fit into corresponding holes in the side walls 24 of the table 15. It can be seen from the fact that the gate 121 is located immediately below the perforating station 25 and hence directly adjacent the pins 61, that upon the closing of the gate 121, fluid which has been running down the table 15 from the upper trough 31, and also falling from the spillway 102 of the pin bathing trough 101, will be trapped by gate 121. A pool of meat tenderizing solution will accumulate immediately above the gate 121 until it is opened, at which time all of the accumulated tenderizing solution will pour down the table 15 until it reaches the screen 33 and falls into the trough 32. Thus, in addition to stopping the meat, the gate means 120 serves to more completely immerse the meat in a pool of tenderizing solution for a controlled period. Also, the accumulated pool of fluid provides floatation action to rapidly "wash" the piece of meat down the table 15 when the gate 121 opens.

Opening and closing of the gate 121 is accomplished by a standard pneumatic cylinder such as a 1-inch bore Tomkins Johnson Model No. SM-3. The upper end 127 of the pneumatic cylinder 125 is rotatably connected by a pin 129 to an extension 131 on the frame assembly 16. The end 133 of the piston rod of the pneumatic cylinder 125 is rotatably connected by a pin 134 to an extension 135 of the gate 121. Thus, when the pneumatic cylinder 125 is actuated, it will rotate the gate 121 about its hinge 123. The gate 121 is stopped in its fully closed position by the front surface 137 of gate 121 striking the edge of the guide plate 62. The hinge 123 is high enough above the table 15 so that when the gate 121 has been swung to its open position by pneumatic piston 125, pieces of meat at the perforating station 125 may freely slide under the gate 121 and down the table 15.

Endless belt means 150 and 151 may be provided at the inlet and outlet of the device 10, respectively, to drop meat onto the upper end of the table 15 and to retrieve it after it has been processed and slides off the lower end.

The operation of the machine 10 of the invention utilizes the process of the invention. Consequently, the following explanation of the operation of the machine 10 will also serve to explain the process of the invention. It is to be understood that many of the functions of the machine 10 are not essential to the process, and that the process may be performed by hand or by many other different machines.

To operate the machine 10 the table 15 must first be set to the desired angle with respect to the horizontal. The adjustment is made with bolts 18, 20 and 21, as described above. The angle at which the table is set is not critical. Increasing the tilt of the table 15 will, of course, increase the velocity at which the pieces of meat will slide down it. However, the sliding velocity of the meat will also be affected by the amount of fluid upon the table. The presence of a fluid film of meat tenderizer upon the surface 26 of the table 15 allows the meat to slide downwardly upon the table 15 by its own weight during the operation, thus eliminating all need for moving belts, attachment of hooks to the meat, etc. Concurrently, the tenderizing fluid upon the surface 26 serves to evenly bathe the under surface of the meat with tenderizing solution without the meat having to be turned over during the process.

A piece of meat, such as a steak, drops from the end of the moving belt 150 onto the fluid covered surface 30 of table 15. Upon landing on the table 15, it immediately begins sliding toward the perforating station 25. As it nears the perforating station 25, the meat will strike and deflect the extension arm 52 of the switch 51, setting in motion the control apparatus 50. The piece of meat continues to slide until it has entered the perforating station 25 at which point it is stopped by the closed gate 121. It will be noted that the initial positions of the moving parts are as follows: the gate 121 is closed and the upper yoke 65 is raised, hence the pins 61 are raised above the surface of the table 15, allowing the piece of meat to slide into the perforating station 25 without interruption. The control apparatus 50 now having been actuated by switch 51, the pneumatic power supply and valve menas 190 applies compressed air to the pneumatic cylinder 81 of the piston assembly driving means 80. Thus, the upper yoke 65 is forced down with considerable pressure upon the upper ends of the coil springs 63 on each pin 61. As can be seen particularly from IGURE 2, when the pin assembly 60 has completed its full downward movement (which is limited by the travel of the piston of the pneumatic cylinder 81), the pins 61 will have been driven substantially clear through the flesh portions of the piece of meat 200 by the force of the compressed springs 63. This force is sufficient to drive the pins 61 through any thickness of flesh. However, it can be seen that where the pins 61 have struck a bone 201 or very hard gristle structure, that the downward movement of the pins 61 will have stopped upon this material, as the force of the compressed springs 63 is insufficient to cause penetration. Each pin 61 adapts its penetration to the contour of the bone structure, insuring that all of the meat has been penetrated except the actual bone portion itself. This is a result of the independent suspension of each pin 61. The possibility of breakage of any of the pins 61 is eliminated, as the maximum force which can be applied to any pin 61 is only that of the maximum compression force of its coil spring 63.

Upon the completion of the downward movement of the pin assembly 60, the upward movement is automatically immediately begun, so that the pins 61 are immediately withdrawn from the meat. If the meat adheres to the pins 61, the lower surface of the guide plate 62 will restrain the meat until the pins 61 have fully withdrawn. As noted above, the mechanical piercing of the meat by the pins 61 performs some tenderization itself. However, the principal effect of the device 10 is to introduce into the meat sufficient tenderizing solution so as to produce chemical tenderization throughout the entire body of the meat. It has been found that the device 10 will accomplish this if either the pins 61 themselves or the surface of the meat are thoroughly wetted with tenderizing solution before the pins 61 perforate the meat. In the device 10, both the pins 61 and the upper surfaces of the meat are so wetted. If it were desired to only place tenderizing solution on the surface of the meat, this could be accomplished at some step prior to the perforation process. In such case, the rods are in effect bathed by the tenderizing solution on the surface of the meat itself.

Immediately upon the withdrawal of the pine 61 from the meat, the gate 121 is opened by its pneumatic cylinder 125. This releases both the piece of meat and the pool of tenderizing solution which has accumulated during the period in which the gate 121 is closed. The normal tendency of the meat to slide down the surface 26 of the table 15 is accelerated by the rush of fluid. When the meat and tenderizing fluid reach the screen 33, the free fluid immediately pours through the spaces in the screen 33 into the trough 32. The piece of meat, being well covered with a film of fluid, will slide across the bars of the screen 33 and in so doing, excess tenderizing solution will drip off into the trough 32. The piece of meat retains sufficient lubrication from the tenderizing solution to be able to easily slide down the rest of the table 15, sliding off onto the surface of the endless belt 151. From there the meat may be carried to further processing steps, for example, quick freezing the meat to stop the chemical tenderization process.

The appearance of the meat is virtually unchanged by the tenderization process of the invention. As long as relatively small diameter pins 61 are employed, the surface of the meat appears undisturbed, due to a natural tendency of the meat to close small holes by itself almost immediately after they are made. This is in sharp contrast to the appearance of meat which has been mechanically masticated in the usual manner by crushing or cutting the meat.

In view of the foregoing disclosures, it is clear that there has been provided hereby an improved means for tenderizing meats, particularly those which contain bone or other hard substances, which fully preserves the appearance of such meat. It is contemplated that further variations and modifications within the purview of those skilled in the art can be made herein, and it is intended to cover in the appended claims all such variations and modifications as fall within the true spirit and scope of the invention.

What is claimed is:

1. An apparatus for applying meat tenderizing liquid to pieces of meat, particularly those having bone therein, comprising: a table having a surface substantially tilted from the horizontal; means for applying meat tenderizing liquid on said surface of said table so that pieces of meat slide by gravity down said surface; a rod guide mounted to said table; a plurality of closely spaced apart solid meat penetrating rods in said rod guide each independently mounted normal to said surface of said table for reciprocal movement between an upward position and a downward position relative said surface of said table, said rods having a diameter sufficiently small so that pores formed in meat penetrated thereby are immediately self-closing; resilient force transmission means connected to each said rod; driving means connected to said force transmission means for driving said rods between said upward and downward positions; arresting means mounted to said table for arresting pieces of meat adjacent said rods; and means for bathing the exterior surfaces of said rods with meat tenderizing liquid so that said rods carry meat tenderizing liquid on the exterior surfaces thereof into pieces of meat.

2. The meat treatment apparatus of claim 1 wherein said arresting means comprises a closable gate making a liquid retaining fit with said surface of said table when in a closed position therewith.

References Cited by the Examiner

UNITED STATES PATENTS

| | | |
|---|---|---|
| 42,484 | 4/1864 | Holbrook. |
| 681,266 | 8/1901 | Roop _____ 17—26 |
| 1,987,239 | 1/1935 | Rasmussen _____ 17—28 |
| 2,560,060 | 7/1951 | Zwosta _____ 99—256 |
| 2,663,247 | 12/1953 | Hensgen et al. _____ 99—256 |
| 2,688,556 | 9/1954 | Komarik et al. _____ 99—159 |
| 2,756,666 | 7/1956 | Zaenkert _____ 99—257 |
| 2,776,690 | 1/1957 | Warren. |
| 2,821,901 | 2/1958 | Abrams _____ 99—257 |
| 2,854,342 | 9/1958 | Komarik _____ 99—159 |
| 3,016,004 | 1/1962 | Harper et al. _____ 99—255 |
| 3,081,691 | 3/1963 | Schmidt _____ 99—257 |
| 3,149,554 | 9/1964 | Greenspan _____ 99—254 |

FOREIGN PATENTS 502,486   7/1930   Germany.

WALTER A. SCHEEL, *Primary Examiner.*

HYMAN LORD, BILLY J. WILHITE, *Examiners.*